(12) United States Patent
Dietrich et al.

(10) Patent No.: US 8,517,048 B2
(45) Date of Patent: Aug. 27, 2013

(54) FLOW CONTROL VALVES

(75) Inventors: Ulrich Dietrich, Oberdiesen (DE); Jürgen Knobloch, Ruderatshofen (DE)

(73) Assignee: AGCO GmbH, Marktoberdorf (DE)

( * ) Notice: Subject to any disclaimer, the term of this patent is extended or adjusted under 35 U.S.C. 154(b) by 1348 days.

(21) Appl. No.: 11/837,724

(22) Filed: Aug. 13, 2007

(65) Prior Publication Data

US 2008/0041458 A1   Feb. 21, 2008

(30) Foreign Application Priority Data

Aug. 15, 2006 (GB) .................................. 0616168.1

(51) Int. Cl.
 *F16K 35/00* (2006.01)
(52) U.S. Cl.
 USPC ........... 137/383; 251/114; 251/116; 251/285; 74/534
(58) Field of Classification Search
 USPC .................. 251/284, 285, 98, 103, 107, 114, 251/95, 99, 113, 111, 116, 231, 93; 137/383; 74/528, 532, 534
 See application file for complete search history.

(56) References Cited

U.S. PATENT DOCUMENTS

| | | | | |
|---|---|---|---|---|
| 2,877,798 A | * | 3/1959 | Hansen | 251/114 |
| 3,143,894 A | * | 8/1964 | Tennis | 74/105 |
| 3,400,790 A | * | 9/1968 | Ruhl et al. | 477/113 |
| 3,509,701 A | * | 5/1970 | Clarke | 56/208 |
| 3,759,333 A | * | 9/1973 | Rivinius | 251/284 |
| 4,526,055 A | * | 7/1985 | Batchelor et al. | 251/114 |
| 4,966,518 A | * | 10/1990 | Kourogi et al. | 414/700 |
| 5,622,199 A | * | 4/1997 | Pieper | 251/94 |
| 6,286,696 B1 | * | 9/2001 | Van Gorp et al. | 212/343 |
| 2005/0274831 A1 | * | 12/2005 | Burdick | 239/569 |

FOREIGN PATENT DOCUMENTS

| | | |
|---|---|---|
| DE | 3733371 | 4/1989 |
| DE | 3801072 | 6/1989 |
| DE | 3925771 | 2/1991 |
| DE | 20212458 | 2/2004 |

OTHER PUBLICATIONS

European Search Report for corresponding European Application No. EP 07013745 dated Dec. 14, 2007.

* cited by examiner

*Primary Examiner* — John K Fristoe, Jr.
*Assistant Examiner* — Andrew J Rost

(57) ABSTRACT

A mechanically operated proportional flow control valve (8) which a valve spool (9) is described, which is moveable between two end limits limiting a regulating range. A device (20, 22) is described for selectively limiting the regulating range of the valve (8). This device can be used to block "locked-in" positions ($F^1$, $RH^1$) of the spool (9) at the end limits of the regulating range. The device includes a locking bar 20 which has locking formations (28, 29) which engage a pin (22) on a lever (11) connected with the spool (9).

9 Claims, 6 Drawing Sheets

FLOW CONTROL VALVES

This application is based on, and claims the benefit of priority to, UK application GB 0616168.1, filed 15 Aug. 2006, which priority application is hereby incorporated by reference.

BACKGROUND OF THE INVENTION

1. Field of the Invention

The invention relates to a mechanically operated proportional flow control valves with a valve spool movement which has a non-indexed regulating range, a neutral position, which is automatically assumed if the actuating force applied to the spool is released, and at least one so-called "locked in" position at one at least of the two end limits of the regulating range in which the spool is locked in a fixed position. Hereinafter such a valve is referred to as "a valve of the type described".

In agricultural operations a variety of attachments are used for different work. Each of these pieces of equipment makes individual demands on the vehicle-borne hydraulics and in particular on the functions of the vehicle-borne hydraulic valves and their control. Thus, there are attachments, the use of which requires hydraulic valves, which are designed to "lock-in" automatically in a certain operating position, so that the operator does not have to apply the actuating force continuously. This automatic locking may not be desired for some applications and can even lead to safety-critical operating errors. For example, with regard to the operation of a front loader some professional associations prescribe that the lifting of the front loader rocker must be interrupted if the operator is no longer operating the lever in order to prevent injury to humans and damage to equipment as a result of the lift movement continuing without conscious control by the operator. This so-called dead man circuit, can only be guaranteed with a hydraulic valve with a "locked-in" position if the "locked-in" position is disabled (or "locked-out") for this particular application. This causes problems when it is desired to be able to use the same hydraulic valve to also control another attachment where the "locked-in" position of the hydraulic valve is required.

Controls for front loaders are known from practice, which have their own control unit only to be used for the front loader. This can be fitted in the driving cab and contains vehicle-borne controls and hydraulic valves, which on the manufacturer's side meet the requirements mentioned for "locking out" or "locking in" functions. This execution, however, has the disadvantage that, particularly for use of the front loader, control elements must be placed in the driving cab and bowden cables to the control valves on the vehicle must be routed through the cab. As a result leakages arise, which increase the sound and noise level in the cab, and high expenditure of time is required for conversion. The use of a separate command and control unit for the front loader further leads to high ancillary costs, which can be avoided by using the vehicle-borne command and control mechanics, that is to say the control valves, of the agricultural tractor.

2. Description of Related Art

Similar hydraulic control equipment for hydraulics, wherein the "lock-in" of the valve spool of a mechanically operated proportional directional control valve is switched off via hydraulic control equipment if the operating pressure is exceeded is known from German Patent DE 3801072 C1. For this purpose the control lines of the "lock-in" control are connected via a hydraulic timer to the pressure circuit. If a certain operating pressure in the circuit is exceeded the pressure is passed on via the control line and timer to a hydraulic cylinder, which releases the mechanical "lock-in" device, so that the valve control gate returns to its neutral position and therefore no pressure flows to the consumers.

From German Patent DE 3733371 A1 it is also known, instead of a hydraulically operated locking device, to use an electrohydraulic locking device, wherein the control of the locking operation is effected when a certain operating pressure is reached to actuate an electrical switch via a barometric cell, which passes on this signal via an electrical timer, here a relay, to a solenoid 2-way valve, which then operates the hydraulic cylinder of the locking device via a control line.

With both the above prior art arrangements the control of the locking device depends on the operating pressure in the system. Deliberate switching of the locking device on or off by the operator is not possible as a result. Although a device can be derived from these solutions, in which the locking can be deliberately switched on or off, this requires purely hydraulic or electrohydraulic control of a locking device and thus the use of quite costly structural parts. Moreover, major interference with the vehicle hydraulics or electrical equipment is necessary for retrofitting or for optional installation of such a locking device. Sometimes commercial valves cannot be used for installing this locking function and have to be replaced by valves which must be adapted for installing the locking device and are therefore substantially more expensive.

It is an object of the invention to provide a proportional flow control valve of the type described which overcome the above problems.

BRIEF SUMMARY OF THE INVENTION

The object is achieved by providing the flow control valve with a device for selectively limiting the regulating range of the valve.

The structural parts needed for the device are simple, mechanical components of low manufacturing and assembly cost, which can be fitted if necessary to existing vehicle-borne valves. By using the existing vehicle-borne valves the operator controls of the valves fitted in the cab can also be used, whereby the operation of different attachments is standardized and the costs of operating these attachments can be kept to a minimum. In addition, the device can be retrofitted in simple way without interfering with the valve itself or with the pressure circuit. This is very advantageous if the operational use of the agricultural tractor is changed by fitting other attachments and the device is not always or is no longer required. Moreover, with each attachment the operator can decide himself whether the locking device is necessary and very simply to switch this on or off and therefore to control several attachments with one hydraulic valve.

As a result the possible applications of an agricultural tractor, which is equipped with this device, are substantially increased and the change-over of attachments simplified for the operator. This leads to more economic use of the agricultural tractor.

BRIEF DESCRIPTION OF THE DRAWINGS

An embodiment of the present invention will now be described, by way of example only, with reference to the accompanying drawings in which.

DETAILED DESCRIPTION OF PREFERRED EMBODIMENTS

Figure 1:
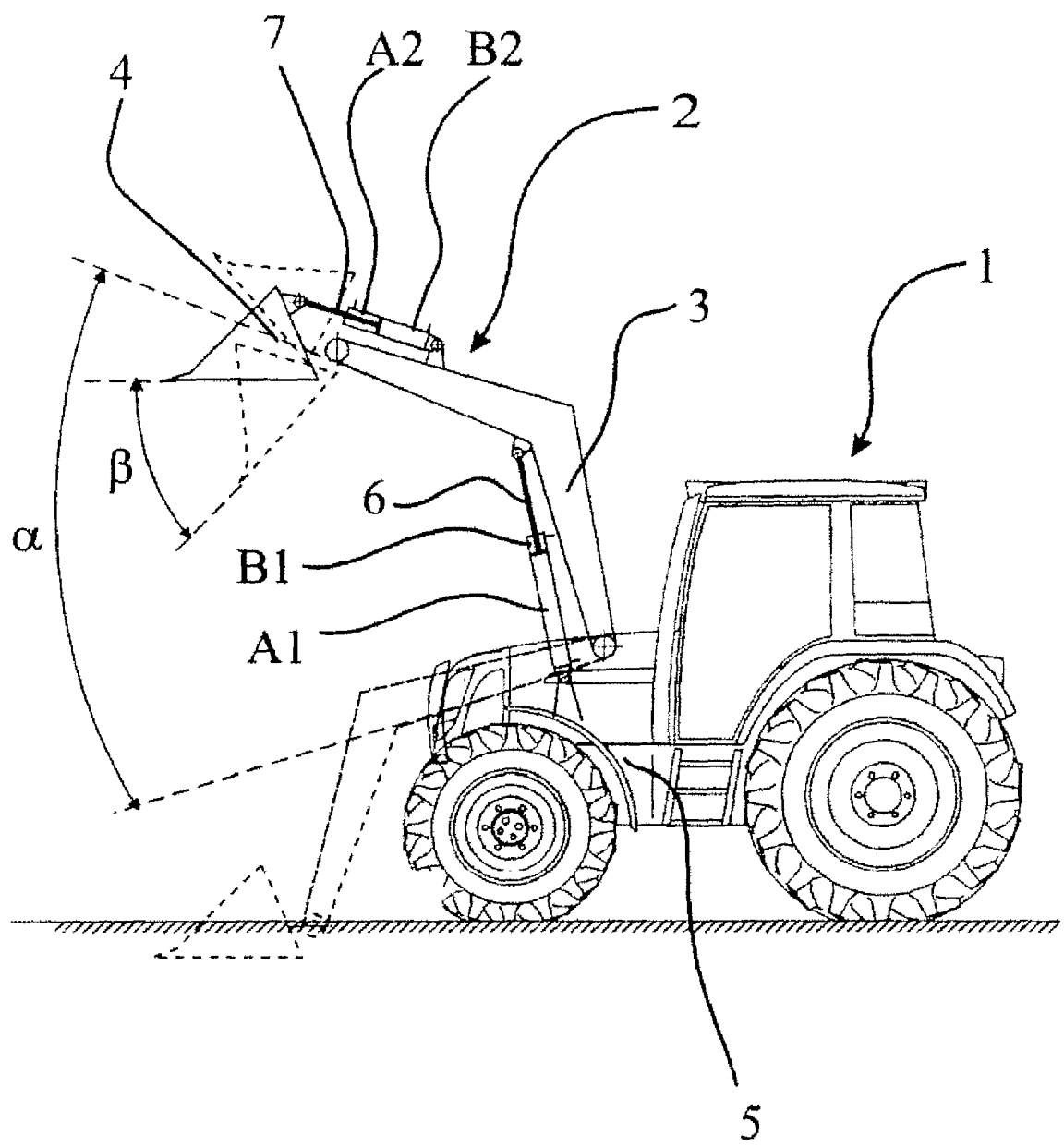
FIG. 1 is a schematic illustration of an agricultural tractor with front loader mounted thereon.

FIG. 1 shows an agricultural tractor 1 on which a front loader 2 is mounted. The front loader basically consists of front loader arms 3 and a front loader attachment 4. The front loader arms 3 are rotatably connected to the chassis 5 of the agricultural tractor 1 in the plane of projection. So that the front loader arms 3 can pivot, each arm has a hydraulic cylinder 6, which has two cylinder chambers A1, B1 connected between the vehicle chassis 5 and the arm 3. The stroke of the operating cylinders 6 for the front loader arms 3 and therefore the pivoting angle α of the front loader arms 3 is controlled by the supply and discharge of the pressure in the cylinder chambers A1 and B1.

The front loader attachment 4 (here illustrated as a bulk material shovel) is rotatably connected to the front loader arms 3 in the plane of projection. So that the front loader attachment 4 can pivot relative to arm 3, an operating cylinder 7, which has two cylinder chambers A2, B2, is connected between the arms 3 and the front loader attachment 4. The stroke of the operating cylinder 7 for the front loader attachment 4 and the pivoting angle β of the front loader attachment are controlled by the supply and discharge of the pressure in the cylinder chambers A2 and B2.

Figure 2:
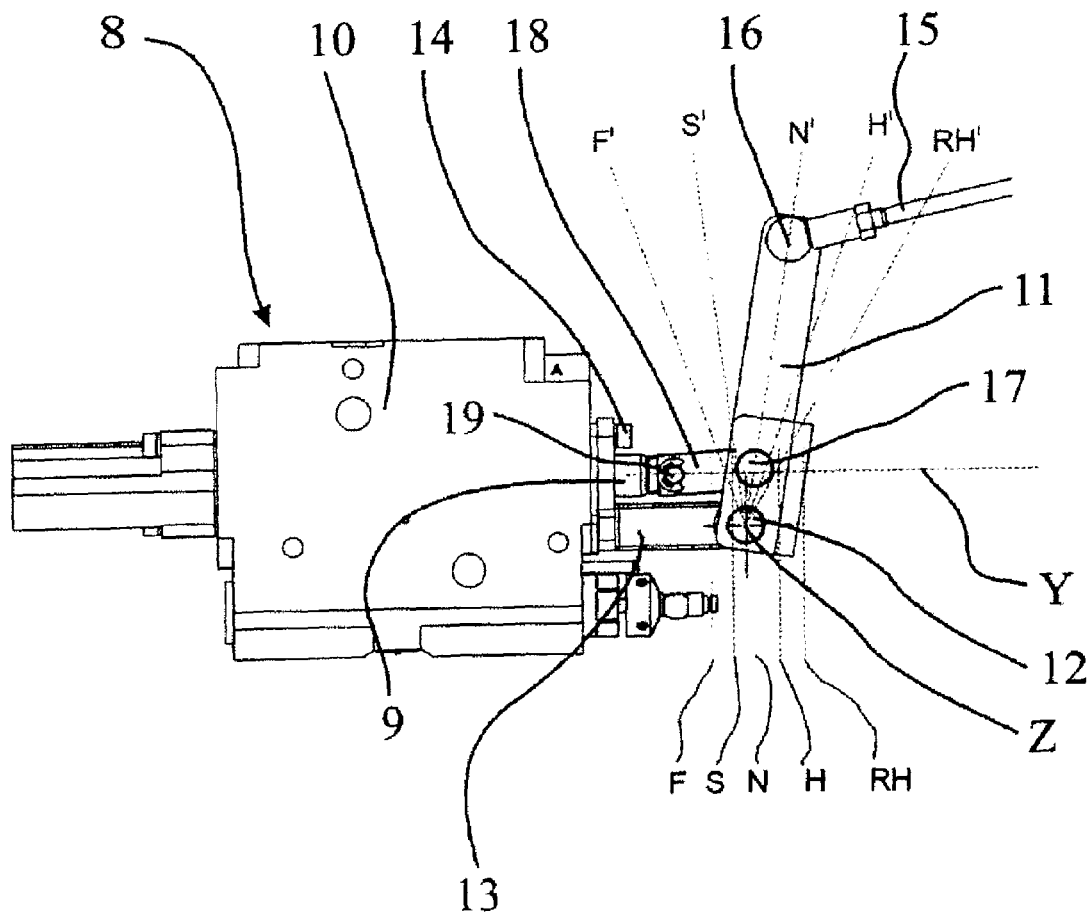
FIG. 2 is a side view showing the regulating range of a mechanically operated proportional flow control valve of the type described with lever without the locking device of the present invention.

For controlling the supply of the pressure to the respective cylinder chambers of the two operating cylinders, two mechanically operated proportional directional control valves 8 each with a valve spool 9 are used, the basic function of which is described with the help of FIG. 2. The valve 8 substantially consists of a valve housing 10 and a valve spool 9, which changes the flow and the flow direction of the pressure through a linear movement along a spool axis Y, the so-called spool travel. The valve spool 9 is moved by an actuating force acting along the axis Y. The ports (not illustrated) for the consumers A, B, port T (return to the tank), port LS (load sensing connection for pressure and volume adjustment to the momentary requirements of one or more consumers) and port P (supply of pressure from the pump) are integrated in the valve housing 10. The valve spool 9, as provided by the manufacturer, has a neutral position N, which if the actuating force ceases, is automatically assumed through a return mechanism, although the spool is not locked in the neutral position. In the neutral position, ports A and B are closed so no pressure flows to or from the consumers. If the valve spool 9 is shifted from its neutral position N, the flow rate increases as the distance from the neutral position N becomes greater. In the case of the valve 8 described here the movement of the spool 9 to the right is arranged by the manufacturer to provide pressure flow from the pump port P to the consumer on port A and a return flow of the pressure from the consumer via port B into the tank port T. Movement of the spool 9 to the left is arranged to provide pressure flow from the pump port P to the consumer on port B and a return flow of the pressure from the consumer via port A into the tank port T. Moreover, the valve 8 has two "locked-in" positions F, HR at the end limits of the regulating range. If the valve spool 9 shifts to the right or left shortly before the end of the regulating range, a position of the valve gate H or S is reached briefly, which if it is exceeded leads to locking of the valve spool 9.

In the "locked-in" position RH to the right of the neutral position N the valve spool 9 remains in this position, even though the actuating force no longer prevails, and the pressure flows to the consumer on port A, while the pressure is discharged via port B on the valve from the consumer into the tank port T. The left "locked-in" position F is a so-called free floating position, that is to say ports A, B and the port to the tank T are hydraulically connected by the valve spool and separated from the pump at port P; the pressure can thus circulate between the consumer ports, if outside forces affect a hydraulic cylinder for example. This is called pressure-free pump circulation.

Since the regulating range of the valve spool 9 only amounts to 19 mm in total and therefore the proportioning ability of the operating movement is not sufficient, the operating movement is translated by means of a pivotable lever 11, which is pivotally mounted about the axis Z on a mounting bracket 13 by means of a pin 12. The bracket 13 is detachable connected to the valve housing 10 by the fixing bolts 14. The operating movement of the control lever (not illustrated) is transmitted to the lever 11 via a connecting rod 15 and a connecting ball joint 16.

For transforming the pivot movement of the lever 11 to a linear movement of the valve spool 9 a pin 17 is non-rotatably connected to the lever 11, which moves the valve spool 9 via a forked rod 18, which is connected with spool 9 via a further pin 19. The positions $F^I$ $S^I$ $N^I$ $H^I$ and $RH^I$ of the lever 11 therefore correspond to the positions F, S, N, H and RH of the valve spool.

Figure 3:
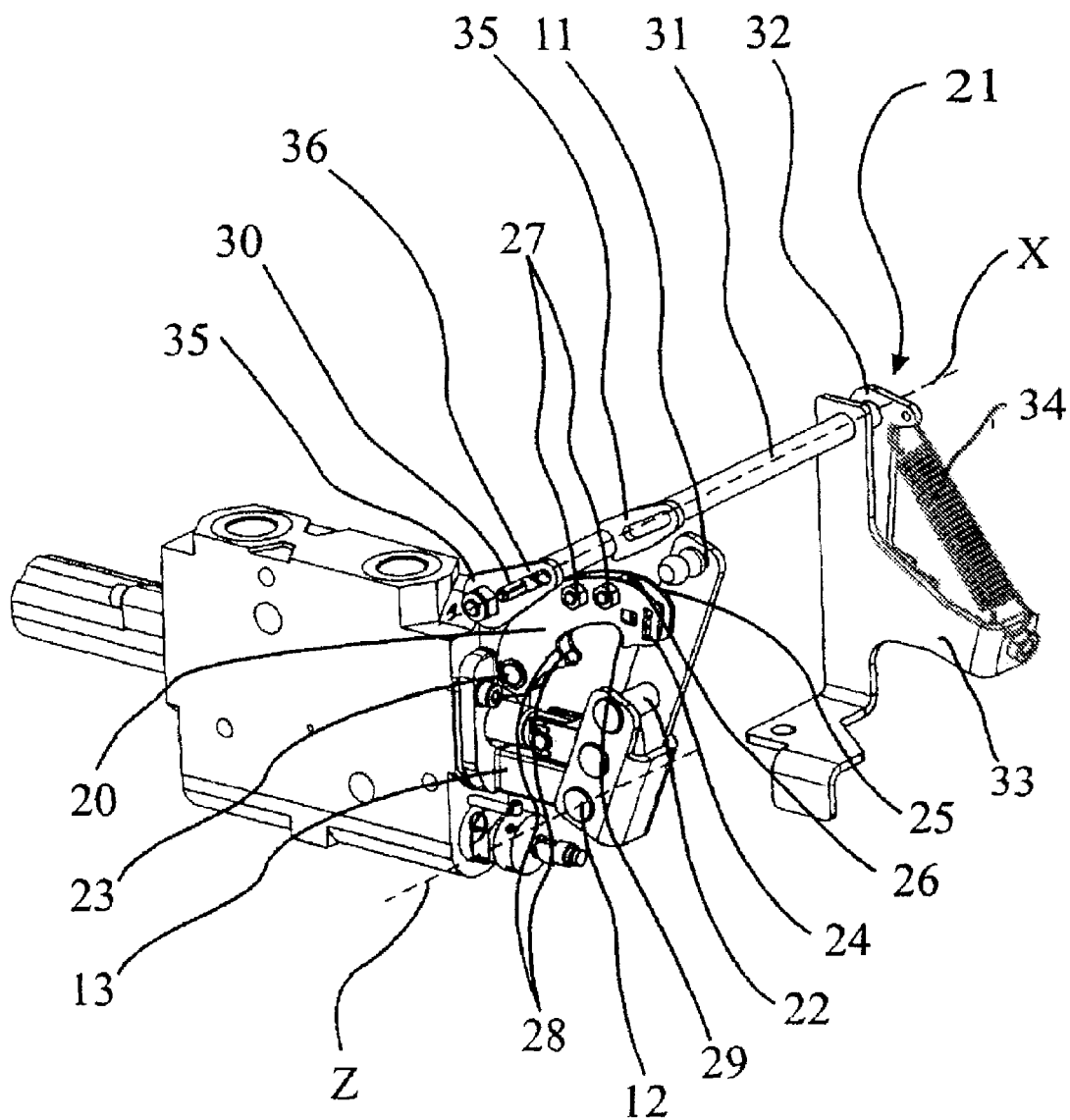
FIG. 3 is a perspective illustration of a mechanically operated proportional flow control valve of the type described with a locking device of the present invention in a disengaged position.

FIG. 3 shows a mechanically operated proportional flow control valve fitted with a locking device in accordance with the present invention which consists of a locking bar 20 and a locking bar control 21 mounted on the bracket 13. The lever 11, compared with FIG. 2, is provided with a non-rotatable catch pin 22, which follows a circular path about the axis Z. The mounting bracket 13 from FIG. 2 is further expanded by a bearing bore (not illustrated), in which the locking bar 20 is rotatably mounted via a locking bar pin 23, and a bearing bore (not illustrated) for the locking bar control 21. The locking bar 20, rotatable about pin 23, consists of a front locking bar plate 24 and rear locking bar plate 25, between which a catch plate 26 is detachably fitted via the clamping screws 27. A locking formation in the form of catches 28, which can engage the catch pin 22 to limit the movement of lever 11 in one direction, is integrated in a symmetrical way in the left and right locking bar plates 24 and 25. A catch 29 on a catch plate 26 which can engage the catch pin 22 and limit the movement of lever 11 in the other direction is also provided on bar 20. In order to prevent the catch pin 22 from being able to pivot the locking bar 20 out of engagement with pin 22, the catches 28 and 29 are implemented in such a way that the periphery of the catch pin 22 is also enclosed in the lower region and as a result the catch pin 22 cannot press the locking bar 20 out of its lower situation. The locking bar 20 is further equipped with a driver pin 30, which is non-rotatably connected to the locking bar plates 24, 25.

The locking bar control 21 essentially consists of a locking bar rod 31 which is connected non-detachably to a locking bar lever 32 at one end of the locking bar rod 31. The lever 32 is pivoted via a bowden cable (not illustrated) by the locking bar control mechanism (not illustrated). The locking bar rod 31 is rotatably mounted on the mounting bracket 13 via a bearing bore (not illustrated) and a bore in a support 33. A reset spring 34 is attached to the locking bar lever 32 and to the support 33 and guarantees resetting of the locking bar control 21 to the disengaged position. A locking bar driver 35 on rod 31 has a driver groove 36 which engages the driver pin 30 of the locking bar 20 and, when the locking bar control 21 pivots, moves the locking bar 20 into the path of the catch pin 22.

Figure 4:
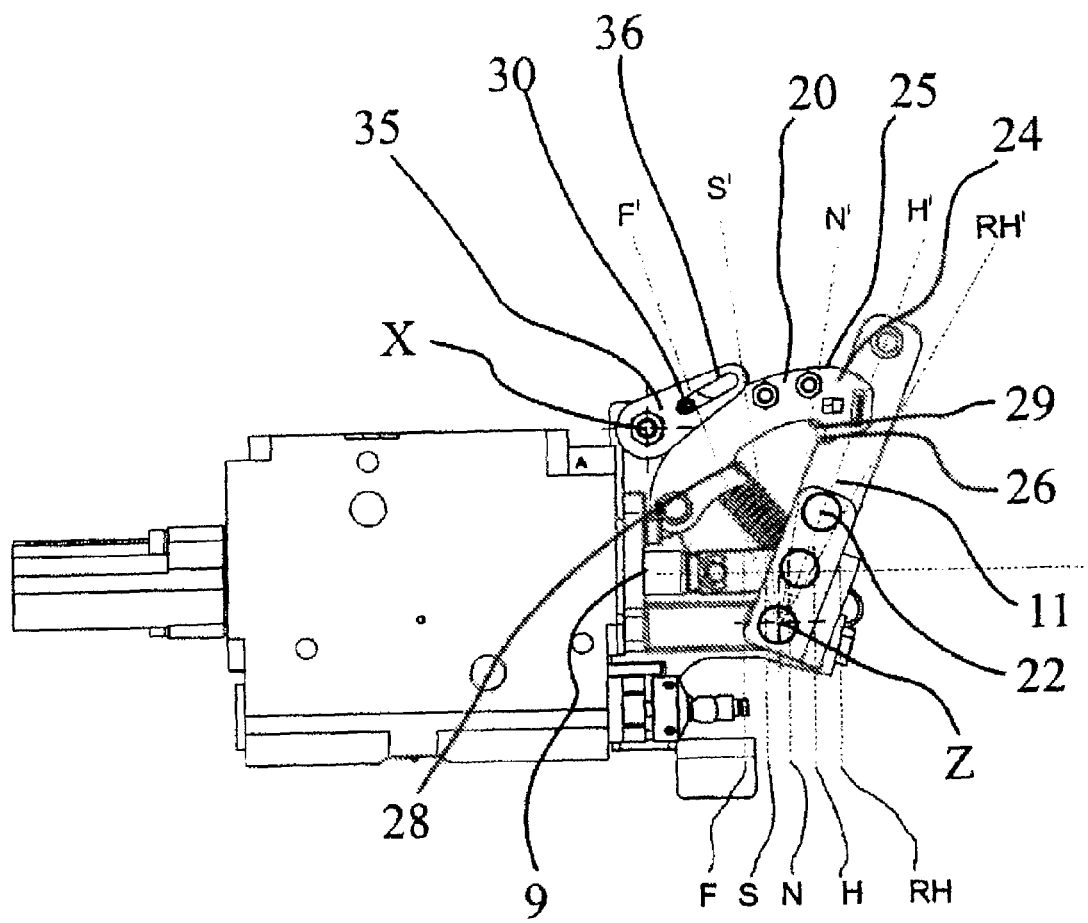
FIG. 4 is a side view of the locking device of a FIG. 3.

FIG. 4 shows the locking device with the locking bar 20 swung out of the path of the catch pin 22. The locking bar driver 35 with the driver groove 36 is in the highest position of its pivot movement about the axis X; the driver pin 30 running in the driver groove 36, swings the locking bar 20 out of the path of the catch pin 22. The catches 28 on the edges of the front and rear locking bar plate 24, 25 and the catch 29 of the catch plate 26 lie outside the circular path about the axis Z, which the catch pin 22 of the lever 11 implements. Thus all the positions $F^I S^I N^I H^I$ and $RH^I$ of the lever 11 and the positions F, S, N, H and RH of the valve spool 9 can be selected by directing the required actuating force on to the lever 11 via the connecting rod 15.

Figure 5:
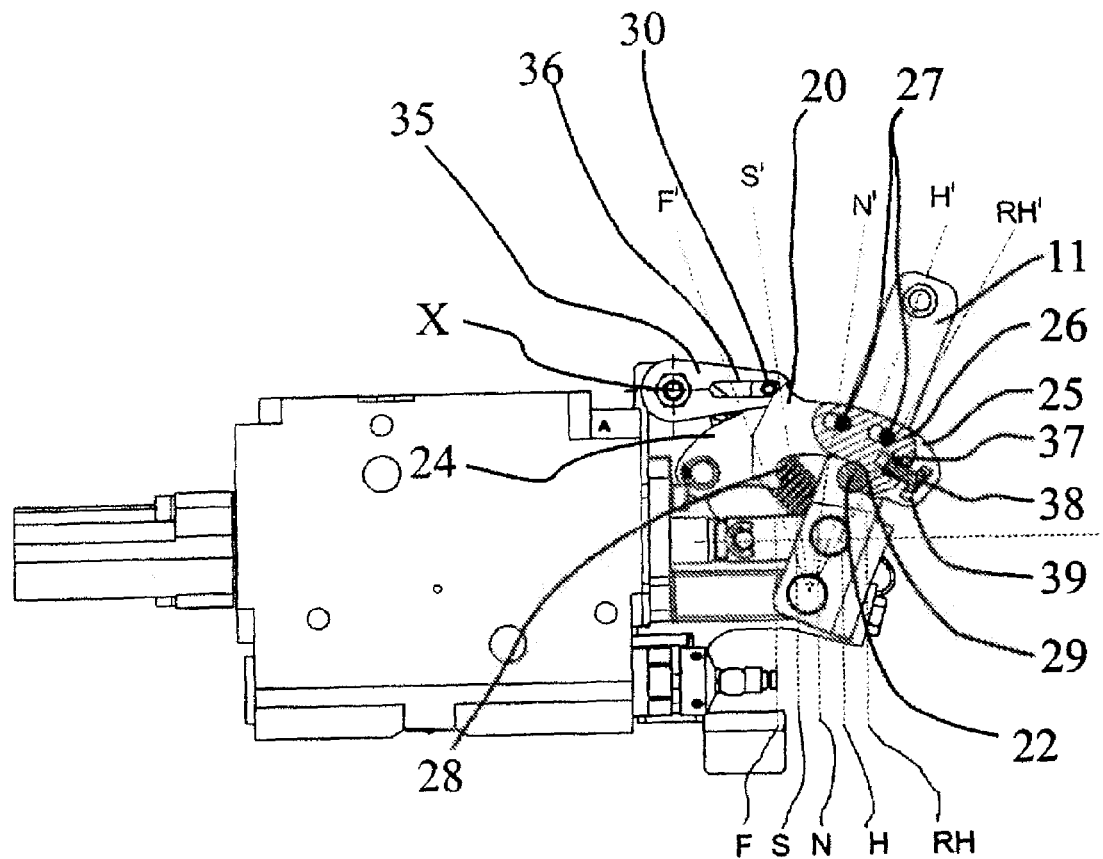
FIG. 5 is a side view of the locking device of FIG. 3 in an engaged position showing parts of the device in section.

FIG. 5 shows the device of FIG. 4, but with the locking bar 20 swung into the path of the catch pin 22. The locking bar driver 35 with the driver groove 36 is in the lowest position of its pivot movement about the axis X; the driver pin 30 running in the driver groove 36, which is non-rotatably connected to the left and right locking bar plate 24, 25, moves the locking bar 20 into the path of the catch pin 22. On a pivotal movement of the lever 11 and therefore of the catch pin 22 about the axis Z, the catch pin 22 on the right side contacts the catch 29 of the catch plate 26, so that when the lever 11 reaches the position $H^I$ and cannot swing out further to the right in order to attain the lock-in position $RH^1$. If the actuating force fails, the lever 11 returns to the position $N^I$. For adjusting the catch plate 26 a thread nut 37 is non-detachably fitted to the catch plate 26. A set screw 38 is screwed into this thread nut 37, which is mounted rotatably but axially fixed, with the aid of cutaways 39 in the front and rear locking bar plates 24 and 25.

If clamping screws 27 are slightly loosened, the catch plate 26 can be moved by rotating the set screw 38, in order to adjust the catch edge 29 of the catch plate 26 in such a way that the lever 11 still just reaches the position $H^1$ but does not lock in the position $RH^1$. As a result, the catch plate 26 is adjusted in such a way that the position of the lever 11 and the valve spool 9 permits maximum flow rate of the pressure through the valve 8, before the pivot angle of the lever 11 and thus the gate travel of the valve gate 9 are limited, in order to block the locked position RH and $RH^1$.

If the lever 11 and thus the catch pin 22 pivot to the left, the catch pin 22 contacts the catches 28 on the edges of the front and rear locking bar plates 24 and 25, so that when the lever 11 reaches the position $S^I$ it cannot swing out further to the left, in order to attain the locked-in position $F^1$. If the actuating force fails, the lever 11 returns to the position $N^I$.

This device arrangement is used to control the front loader attachment 4 in FIG. 1. By blocking the locked-in position $RH^I$ of the lever 11 (and thus also the lock-in position RH of the valve gate 9) it is guaranteed that pressure is only then directed into the cylinder chamber A2 of the operating cylinder of the front loader attachment 7 and thus the attachment 4 is swung upward, if the control lever 11 is operated deliberately. By blocking the locked-in position $F^I$ of the lever 11 (and thus also the lock-in position F of the valve gate 9) it is in turn guaranteed that the cylinder chambers A2 and B2 are not hydraulically interconnected via the valve and the front loader attachment 4 cannot be swung downward by the weight of the load, thus there can be no danger of the load being lost.

Figure 6:
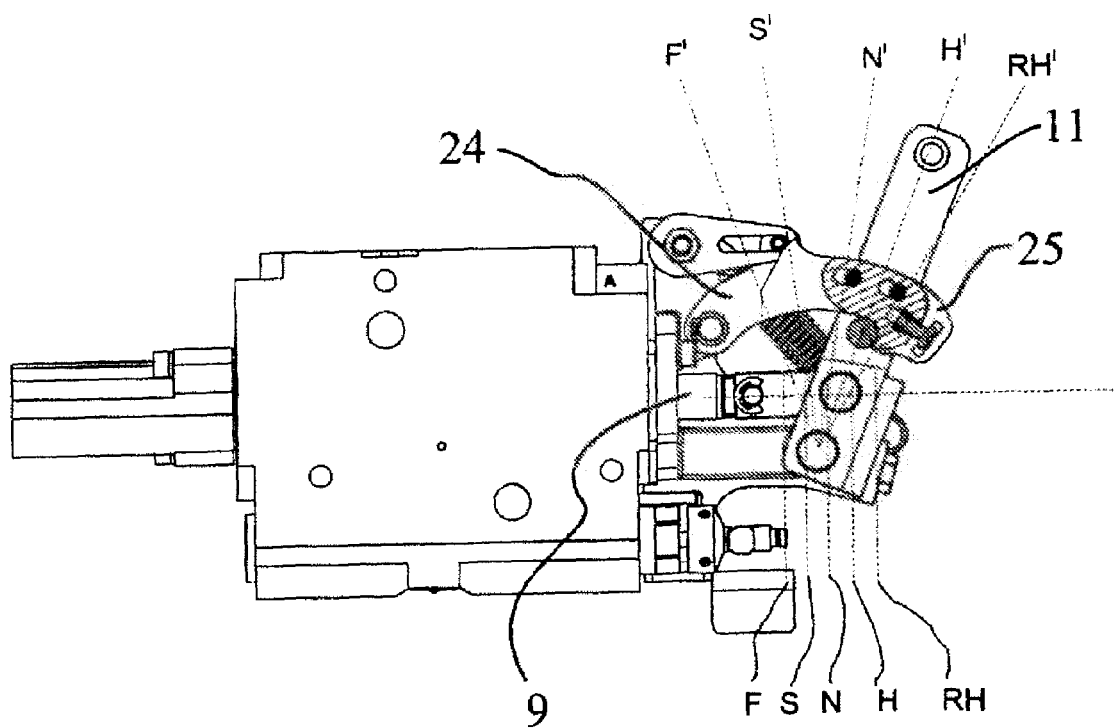
FIG. 6 is a side view of a locking device with only one locking formation in the engaged position.

FIG. 6 shows a device with a one-sided locking device, which differs from the device in FIG. 5 in that the catch edges 28 in the front and rear catch plates 24 and 25 in FIG. 5 are omitted and therefore the lever 11 can also swing into the positions $F^I$ (corresponding to the position F of the valve gate 9) and only the position $RH^I$ of the lever 11 (corresponding to the position RH of the valve gate 9) is blocked.

This device arrangement is used to control the front loader arms 3 in FIG. 1. By blocking the locked-in position $RH^I$ of the lever 11 (and therefore also the lock-in position RH of the valve gate 9) it is guaranteed that pressure is only then directed into the cylinder chamber A2 of the operating cylinder of the front loader arm cylinder 6 and thus the front loader arms 3 are swung upward, if the control lever is operated deliberately. The lock-in position $F^I$ of the lever 11 (and thus also the lock-in position F of the valve gate 9) can be adjusted so that the cylinder chambers A2 and B2 are hydraulically interconnected via the valve. In this position the front loader arms 3 can adapt their position to the ground contour though the action of outside forces, which can occur, for example, if the front loader attachment 4 strikes the ground.

The devices for locking out valves, illustrated in FIG. 5 and 6, are controlled in the embodiment described by a locking bar control 21. For this purpose a further locking bar driver 35, as illustrated in FIG. 3 is non-detachably connected to the locking bar rod 31, which controls a further locking bar 20 to a further valve 8.

If instead of a front loader 2 in FIG. 1 an attachment is mounted, which does not require any locking device or the operation is disadvantageously affected by the locking device, the locking bar control 21 is swung into the upper position, as illustrated in FIG. 4, and in this embodiment the two locking bar drivers 35 and thus the two locking bars 20 on the two valves are swung out of the paths of the two catch pins 22. If a front loader 2 is no longer to be mounted on the agricultural tractor, the device can be removed by loosening the fixing bolts 14 of the valve housing 10 to the mounting bracket 13 in FIG. 3 without interfering with the valve 8 or the pressure circuit and can be replaced by a device, as shown in FIG. 2, which does not have a locking device.

Naturally, the invention is not limited to the exemplary embodiments mentioned above. Thus, for example, it may be necessary to implement the locking bar 20 in such a way that the position F, but not the position RH, of the valve gate is blocked. For this purpose the locking bar 20 with a catch edges 28 in the front and rear locking bar plates 24 and 25 is arranged on the left side, while on the right side the catch plate 26 and its catch edge 29 are omitted. The invention can also be applied to valves which have different or no locked-in positions on the end limits of the regulating range provided by the manufacturer. Moreover, it is conceivable that if a plurality of valves 8 and devices, which are equipped with locking bars 20 are used, each locking bar 20 is operated separately, so that the locking device can be switched on and off separately for each valve 8.

We claim:

1. A mechanically operated proportional flow control valve with a valve spool which is moveable between two end limits limiting a requlatinq range, the valve having at least one "locked-in" position at at least one of the end limits of the regulating range and a device for selectively limiting the requlatinq range;

wherein the device has a selectively pivotable locking bar which can be swung by means of an external locking bar control into and out of the path of a catch pin connected to the valve spool, and wherein the locking bar is designed to limit the regulating range of the valve so that said at least one of the "locked-in" positions can be blocked; and wherein the locking bar has two locking formations which engage the catch pin mounted on a lever which pivots to move the valve spool, wherein at least one of the locking formations is adjustable, in order to compensate existing tolerances and therefore to achieve as high a flow rate of the directional control valve as possible.

2. A valve according to claim 1, in which the locking bar (20) can be swung by means of a manually operated locking bar lever (32) into and out of the path of the catch pin (22).

3. A valve according to claim 1, in which the locking bar (20) consists of two plates (24, 25) with a gap therebetween in which a catch plate (26) which engages catch pin (22) is adjustably fitted.

4. A valve according to claim 3, in which the catch plate (26) is adjustably held between the plates (24, 25) by at least one clamping screw (27) and is adjusted by releasing the at least one clamping screw (27) and turning at least one set screw (38).

5. A valve according to claim 1 in which the device is mounted on a housing (10) of the valve (8).

6. A valve according to claim 5 in which the device is mounted on the valve housing (10) via a bracket (13) which also mounts a linkage (11, 15, 16) for operating the valve spool (9).

7. A valve according to claim 1 in which both "locked-in" positions can be blocked.

8. In a mechanically operated proportional flow control valve with a valve spool that is moveable between two end limits limiting a regulating range, the improvement comprising the provision of a device for selectively limiting the regulating range, the device having a selectively pivotable locking bar that can be swung into and out of the path of a catch pin connected to the valve spool;

wherein the locking bar can be swung by means of an external locking bar control into and out of the path of the catch pin;

wherein the locking bar has locking formations that engage the catch pin mounted on a lever that pivots to move the valve spool;

wherein at least one of the locking formations is adjustable in order to compensate existing tolerances, and therefore to achieve as high a flow rate of the directional control valve as possible; and wherein the locking bar consists of two plates with a gap therebetween in which a catch plate that engages the catch pin is adjustably fitted.

9. A valve according to claim 8, wherein the catch plate is adjustably held between the plates by at least one clamping screw and is adjusted by releasing the at least one clamping screw and turning at least one set screw.

* * * * *